(12) United States Patent
Dilger et al.

(10) Patent No.: US 6,536,469 B2
(45) Date of Patent: Mar. 25, 2003

(54) SELF-CENTERING MAGNET ASSEMBLY FOR USE IN A LINEAR TRAVEL MEASUREMENT DEVICE

(75) Inventors: John P. Dilger, Marshalltown, IA (US); Donald P. Pepperling, Marshalltown, IA (US); Nile K. Dielschneider, Conrad, IA (US); James C. Hawkins, Allen, IA (US); David E. Woollums, Frisco, IA (US)

(73) Assignee: Fisher Controls International, Inc., Clayton, MO (US)

( * ) Notice: Subject to any disclaimer, the term of this patent is extended or adjusted under 35 U.S.C. 154(b) by 124 days.

(21) Appl. No.: 09/761,427

(22) Filed: Jan. 16, 2001

(65) Prior Publication Data

US 2002/0007854 A1 Jan. 24, 2002

Related U.S. Application Data

(63) Continuation-in-part of application No. 09/603,474, filed on Jun. 23, 2000.
(60) Provisional application No. 60/141,576, filed on Jun. 29, 1999.

(51) Int. Cl.[7] .............................................. F16K 37/00
(52) U.S. Cl. ...................................................... 137/554
(58) Field of Search ........................................ 137/554

(56) References Cited

U.S. PATENT DOCUMENTS

| 3,112,464 A | 11/1963 | Ratajski et al. ............... 338/32 |
|---|---|---|
| 4,532,810 A | 8/1985 | Prinz et al. ................... 73/717 |
| 4,570,118 A | 2/1986 | Tomczak et al. ............. 324/208 |
| 4,585,029 A | 4/1986 | Harding .................. 137/625.62 |
| 4,665,362 A | 5/1987 | Abel et al. .................. 324/208 |
| 4,870,864 A | 10/1989 | Io ............................. 73/517 R |
| 4,935,698 A | 6/1990 | Kawaji et al. ............. 324/207.2 |
| 5,359,288 A | 10/1994 | Riggs et al. ............. 324/207.22 |
| 5,497,081 A | 3/1996 | Wolf et al. ............. 324/207.12 |
| 5,570,015 A | * 10/1996 | Takaishi et al. ............. 137/554 |
| 5,572,132 A | 11/1996 | Pulyer et al. ............... 324/318 |
| 5,955,881 A | 9/1999 | White et al. ............. 324/207.2 |

FOREIGN PATENT DOCUMENTS

| GB | 872072 | 7/1961 |
|---|---|---|
| GB | 2 154 340 A | 9/1985 |

OTHER PUBLICATIONS

Abstract of Japanese Publication No. 6–176916, published Jun. 24, 1994.*
Abstract of Japanese Publication No. 3–004123, published Oct. 1, 1991.*

* cited by examiner

Primary Examiner—Gerald A. Michalsky
(74) Attorney, Agent, or Firm—Marshall, Gerstein & Borun

(57) ABSTRACT

A magnet assembly is disclosed for use with a magnetic flux sensor to provide a position sensor adapted to detect a position of a moveable member. The magnet assembly comprises a magnet housing defining an inner surface. A magnet is provided that is sized for insertion into the magnet housing and adapted for movement with the moveable member, the magnet having a north pole and a south pole, wherein the magnet generates a magnetic flux. A centering ring is positioned between the magnet and the magnet housing, the centering ring including a biased wall acting to center the magnet in the magnet housing.

14 Claims, 12 Drawing Sheets

SELF-CENTERING MAGNET ASSEMBLY FOR USE IN A LINEAR TRAVEL MEASUREMENT DEVICE

CROSS-REFERENCE TO RELATED APPLICATION

This is a continuation-in-part of application Ser. No. 09/603,474 which was filed on Jun. 23, 2000, which claims the benefit under 35 U.S.C. §119(e) of U.S. provisional patent application Serial No. 60/141,576 filed Jun. 29, 1999, the disclosures of which are incorporated herein by reference.

FIELD OF THE INVENTION

The present invention generally relates to linear travel measurement devices.

BACKGROUND OF THE INVENTION

In the control of fluid in industrial processes, such as oil and gas pipeline systems, chemical processes, etc., it is often necessary to reduce and control the pressure of a fluid. Regulators are typically used for these tasks by providing adjustable flow restriction through the regulator. The purpose of the regulator in a given application may be to control flow rate or other process variables, but the restriction inherently induces a pressure reduction as a by-product of its flow control function.

By way of example, a specific application in which regulators are used is the distribution and transmission of natural gas. A natural gas distribution system typically includes a piping network extending from a natural gas field to one or more consumers. In order to transfer large volumes of gas, the gas is compressed to an elevated pressure. As the gas nears the distribution grid and, ultimately, the consumers, the pressure of the gas is reduced at pressure reducing stations. The pressure reducing stations typically use regulators to reduce gas pressure.

It is important for natural gas distribution systems to be capable of providing sufficient volumes of gas to the consumers. The capacity of this system is typically determined by the system pressure, piping size, and the regulators, and system capacity is often evaluated using a simulation model. The accuracy of the system model is determined using flow data at various input points, pressure reducing points, and output points. The pressure reducing points significantly impact the capacity of the gas distribution system, and therefore it is important for the system model to accurately simulate the pressure reducing points. The pressure reducing points, however, are within the distribution system and therefore are not considered custody transfer points (i.e., points at which the control of gas flow switches from the distribution system to the consumer). As a result, flow measurement is typically not provided at the pressure reducing points. Furthermore, since the pressure reducing points are not custody transfer points, the added cost of high accuracy is not required. Flow measurement problems similar to those described above with respect to natural gas distribution are also present in other regulator applications (i.e., industrial processes, chemical processes, etc.).

In addition, regulators are subject to failure due to wear during operation, thereby reducing the ability to control pressure along a pipeline. A damaged regulator may allow fluid to leak, thereby increasing fluid waste and possibly creating a hazardous situation. While damaged regulators may be repaired or replaced, it is often difficult to detect when a regulator has failed and determine which regulator is damaged. Detecting a failure and determining which regulator has failed is more difficult in a typical natural gas delivery system, where pipelines may run several miles. Accordingly, apparatus which detects apparatus failure and identifies the location of the failure is greatly desired.

Linear travel measurement apparatus is often provided with equipment having moving members, such as a regulator with a throttling element, to provide feedback regarding operating parameters. In particular, field effect sensors are often used to provide information as to the position of the throttling element. Field effect sensors typically include a magnet and a magnetic field sensor which move relative to each other according to the position of the throttling element. The magnet creates a magnetic flux pattern which is sensed by the magnetic field sensor. As a result, changes in magnetic flux detected by the sensor can be used to infer the position of the magnet, and hence the throttling element. The magnet must be kept at the same longitudinal distance and attitude with respect to the sensor, otherwise the magnetic flux pattern generated by the magnetic will be altered and the linear travel feedback will be distorted and inaccurate.

SUMMARY OF THE INVENTION

In accordance with certain aspects of the present invention, a pressure regulator is provided comprising a main housing having an inlet and an outlet, a fluid flow path being defined between the inlet and the outlet, a throttling element moveable in the fluid flow path, and a throttling element position sensor. The throttling element position sensor includes a magnet housing supported in fixed relation to the main housing and defining an inner surface. A magnet is provided sized for insertion into the magnet housing and adapted for movement with the throttling element, the magnet having a north pole and a south pole, wherein the magnet generates a magnetic flux. A centering ring is positioned between the magnet and the magnet housing, the centering ring including a biased wall acting to center the magnet in the magnet housing. A magnetic field sensor is positioned to detect the magnet flux.

In accordance with additional aspects of the present invention, a magnet assembly is for use with a magnetic flux sensor to provide a position sensor adapted to detect a position of a moveable member. The magnet assembly comprises a magnet housing defining an inner surface, and a magnet sized for insertion into the magnet housing and adapted for movement with the moveable member, the magnet having a north pole and a south pole, wherein the magnet generates a magnetic flux. A centering ring is positioned between the magnet and the magnet housing, the centering ring including a biased wall acting to center the magnet in the magnet housing.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

DETAILED DESCRIPTION OF THE PREFERRED EMBODIMENTS

Figure 1:
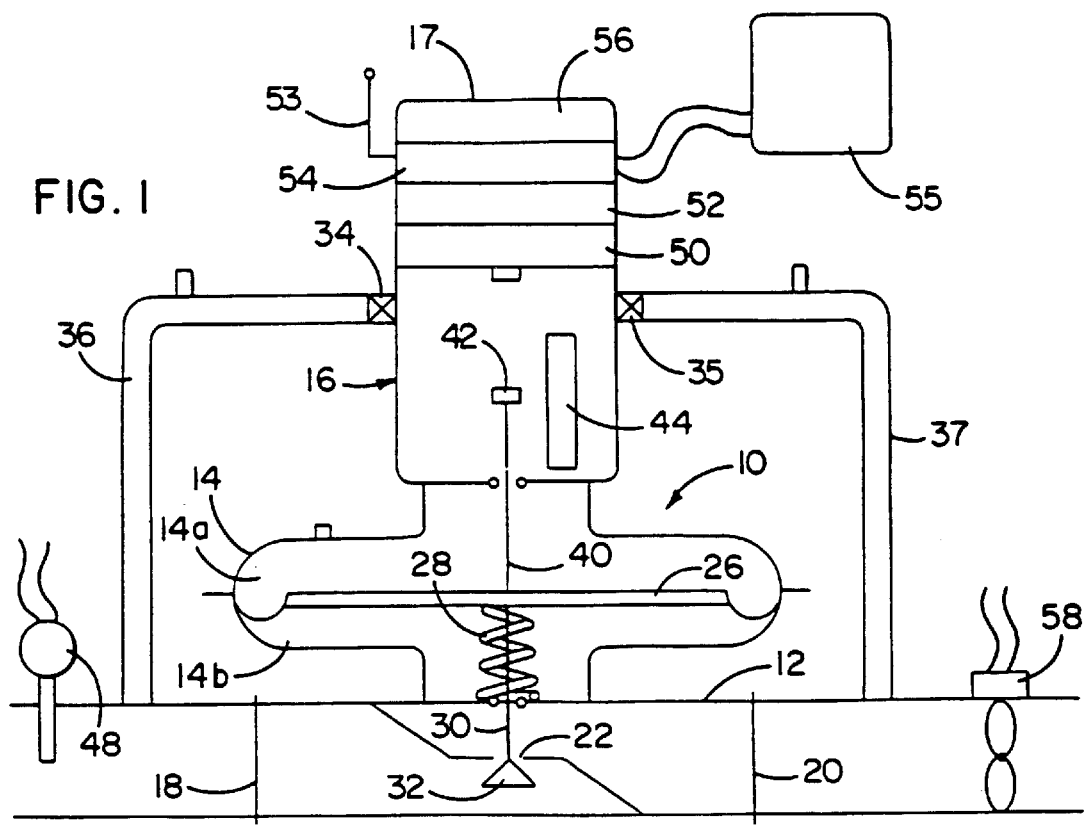
FIG. 1 is a schematic diagram illustrating a regulator with flow measuring apparatus.

FIG. 1 illustrates a preferred embodiment of a fluid pressure regulator, such as a gas pressure regulator 10. The illustrated gas pressure regulator 10 includes gas flow measuring apparatus as will be described hereinafter wherein upstream pressure, downstream pressure, and orifice opening measurements are used to calculate flow and other information. It is to be understood that a liquid pressure regulator also may be provided in accordance with the principles of the invention, as the illustrated gas pressure regulator is merely one example of a fluid pressure regulator according to the invention.

The regulator shown in FIG. 1 includes a regulator body 12, a diaphragm housing 14, and an upper housing 16. Within the regulator body 12, there is provided an inlet 18 for connection to an upstream pipeline and an outlet 20 for connection to a downstream pipeline. An orifice 22 inside the regulator body 12 establishes communication between the inlet 18 and the outlet 20.

A diaphragm 26 is mounted inside the diaphragm housing 14 and divides the housing 14 into upper and lower portions 14a, 14b. A pressure spring 28 is attached to a center of the diaphragm 26 and is disposed in the lower portion of the diaphragm housing 14b to bias the diaphragm 26 in an upward direction.

A stem 30 is attached to and moves with the diaphragm 26. A throttling element, such as a valve disc 32, is attached to a bottom end of the stem 30 and is disposed below the orifice 22. The valve disc 32 is sized to completely block the orifice 22, thereby cutting off communication from the inlet 18 to the outlet 20. Accordingly, it will be appreciated that the pressure spring 28 biases the valve disc 32 in an upward direction to close the orifice 22. The valve disc 32 is formed with a varying cross-section so that, as the valve disc 32 moves downwardly, the unblocked (or open) area of the orifice 22 gradually increases. As a result, the open area of the orifice 22 is directly related to the position of the valve disc 32.

Gas pressure in the upper chamber of the diaphragm 14a is controlled to move the valve disc 32 between the closed and open positions. Pressure in the upper portion of the housing 14a may be provided in a number of different manners. In the present embodiment, pressure in the upper portion 14a is controlled by a loading pilot (not shown). However, the regulator 10 may be of a type which uses a different type of operator, such as an unloading pilot, or the regulator 10 may be self-operated or pressure-loaded, without departing from the scope of the present invention.

A further alternative for controlling the gas pressure in the upper portion of the diaphragm housing 14a includes a first tube running from the upstream piping to the upper portion of the diaphragm housing 14a, with a first solenoid controlling gas flow therethrough. A second tube is also provided which runs from the upper portion of the diaphragm housing 14a to the downstream piping and has a second solenoid disposed therein to control flow therethrough. A PC is connected to the first and second solenoids to control their operation. To increase pressure in the upper portion of the diaphragm housing 14a, the first solenoid is opened to allow upstream pressure into the upper portion, thereby driving the diaphragm 26 downward to open the orifice 22. Gas may be exhausted through the second solenoid to thereby reduce pressure in the upstream portion 14a and raise the diaphragm 26, thereby closing the orifice 22. Regardless of the manner of providing and controlling pressure, it will be appreciated that increased pressure moves the diaphragm 26 and attached valve disc 32 downward to open the orifice 22 while decreased pressure closes the orifice 22. This arrangement is given by way of example only, and is not intended to limit the scope of the present invention, as other arrangements well known in the art may also be used.

Pressure sensors are provided upstream and downstream of the throttling element to measure upstream and downstream pressure levels $P_1$, $P_2$. As illustrated in FIG. 1, the first and second pressure sensors 34, 35 are mounted to the upper housing 16. Tubing 36 extends from the first pressure sensor 34 to tap into piping located upstream of the regulator inlet 18. Additional tubing 37 extends from the second pressure sensor 35 to tap into piping located downstream of the regulator outlet 20. Accordingly, while the first and second pressure sensors 34, 35 are mounted on the upper housing 16, the tubing 36, 37 communicates upstream and downstream gas pressure, respectively, to the first and second pressure sensors 34, 35. In the alternative, the first and second pressure sensors 34, 35 may be located directly in the upstream and downstream piping with wiring running from the pressure sensors to the upper housing 16. To provide for temperature correction, if desired, a process fluid temperature transmitter 48 is located in the upstream piping which measures process temperature.

The upper housing 16 further includes a sensor for determining valve disc position. According to the illustrated embodiment, the stem 30 is attached to the valve disc 32 and is connected to the diaphragm 26. A travel indicator 40, which is preferably an extension of the stem 30, extends from the diaphragm and into the upper housing 16, so that the position of the valve disc 32 corresponds to the position of the valve disc 32. The sensor, therefore, comprises an indicator travel sensing mechanism, preferably a Hall effect sensor. The Hall effect sensor includes a Hall effect magnet 42 attached to an upper end of the travel indicator 40. A magnet sensor 44 is disposed inside the upper housing 16 for sensing the location of the Hall effect magnet 42. By detecting the position of the magnet 42, the location of the valve disc 32 and hence the open area of the orifice 22 may be determined. A second travel indicator (not shown) may be linked to the travel indicator 40 to provide visual indication of valve disc travel. The second travel indicator runs upwardly from the travel indicator 40 and through the upper housing 16 to extend above a top surface of the upper housing 16.

Figure 2:
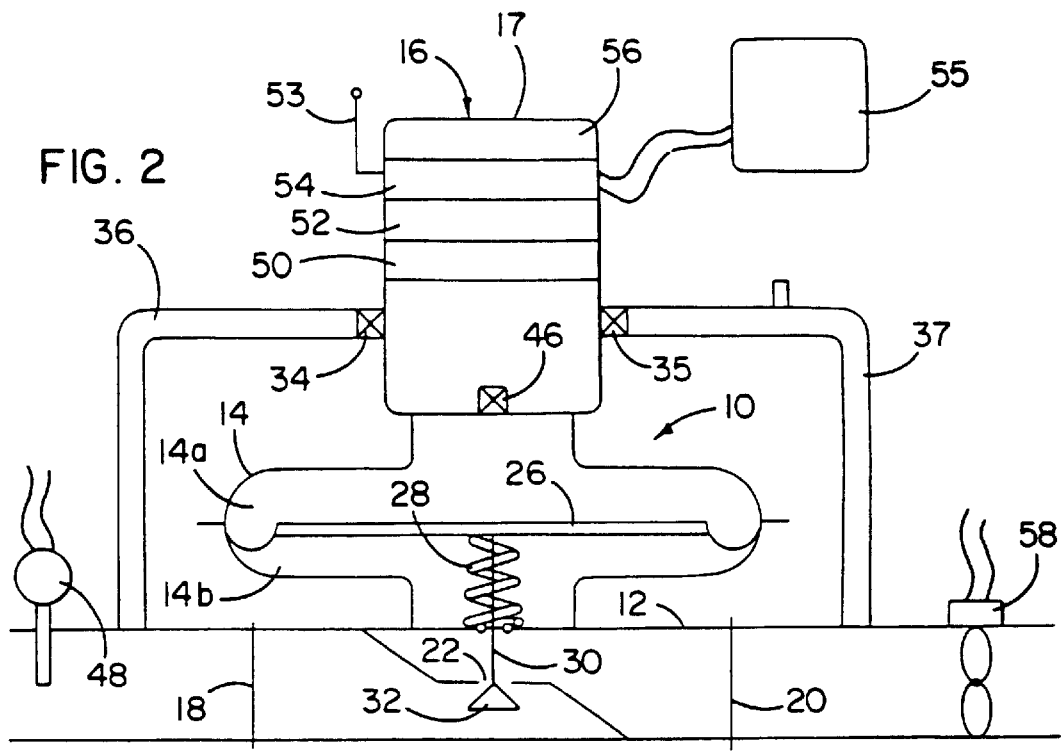
FIG. 2 is a schematic diagram of an additional embodiment of a regulator incorporating flow measuring apparatus.

In the alternative embodiment illustrated at FIG. 2, loading pressure in the upper portion of the diaphragm housing 14a is measured to infer valve disc position. It will be appreciated that the position of the valve disc 32 varies with the pressure present in the upper portion 14a of the diaphragm housing. In this embodiment, a loading pressure sensor 46 is provided in the upper housing 16 for measuring pressure at the upper portion of the diaphragm housing 14a. The measured loading pressure may then be used to determine valve disc position.

Returning to the embodiment of FIG. 1, the first and second pressure sensors 34, 35 and the travel sensor 44 provide output which is fed into an electronic flow module 50. The electronic flow module 50 maybe provided integrally with the regulator, such as in the upper housing 16 as illustrated in FIG. 1, or may be remotely positioned. The inlet pressure, outlet pressure, and valve disc position are used to determine flow through the variable orifice of the regulator 10. For sub-critical gas flow, the flow rate is calculated using the algorithm:

$$F = \sqrt{\frac{K_1}{G*T}} * K_2 * Y * P_1 * \sin K_3 \sqrt{\frac{P_1 - P_2}{P_1}}, \text{ where}$$

F=flow rate,
$K_1$=absolute temperature constant,
G=specific gravity of the flow media,
T=absolute temperature of the flow media,
$K_2$=stem position constant,
Y=stem position,
$P_1$=absolute upstream pressure,
$K_3$=trim shape constant, and
$P_2$=absolute downstream pressure.

The stem position and trim shape constants $K_2$, $K_3$ are specific to the particular size and type of regulator, and are primarily dependent on the specific trim size and shape. As those skilled in the art will appreciate, the product of $K_2$ and Y may be equivalent to a traditional flow sizing coefficient. The above algorithm is suitable for calculating sub-critical (i.e., $P_1-P_2 < 0.5 P_1$) gas flow rate through linear, metal trim valve type regulators.

For critical gas flows, the calculation is modified by eliminating the sine function. For other types of regulators, such as non-linear metal trim and elastomeric style regulators, a similar algorithm is used, however the stem position constant $K_2$ becomes a function related to pressure drop ΔP (i.e., the difference in upstream and downstream pressures $P_1$, $P_2$) and/or valve stem position, as is well known in the art. For liquid flow, the equation becomes:

$$F = \sqrt{\frac{K_1}{G*T}} * K_2 * Y * \sqrt{P_1 - P_2}, \text{ where}$$

F=flow rate,
$K_1$=absolute temperature constant,
G=specific gravity of the flow media,
T=absolute temperature of the flow media,
$K_2$=stem position constant,
Y=stem position,
$P_1$=absolute upstream pressure, and
$P_2$=absolute downstream pressure.

A similar calculation is used in the embodiment of FIG. 2, which measures loading pressure in the upper portion of the diaphragm housing 14a to infer valve disc travel, except a loading pressure constant $K_4$ and a gauge loading pressure $P_L$ replace the stem position constant $K_2$ and the stem position Y values. The loading pressure constant $K_4$ is also application specific and must be determined for each type of regulator 10. For non-linear elastomeric throttling members, the loading pressure constant $K_4$ is a function of ΔP and $P_L$.

In the preferred embodiment, a local flow view module 52 is also disposed inside the upper housing 16. The local flow view module 52 includes an electronic flow totalizer which provides totalized flow information. The local flow view module 52 further has an output port which allows access by a hand-held communication device to access the totalized flow and reset the local flow totalizer for future use. In the currently preferred embodiment, the local flow view module 52 includes an LCD readout enclosed inside the upper housing 16. A cap 17 attached to the top of the upper housing 16 has a clear plastic window which allows the LCD readout to be viewed.

A communication module 54 transmits flow data to an auxiliary communication device 55, such as a remote terminal unit (RTU), a PC, or any other device capable of interrogating the regulator controls. The communication module 54 may include an antenna 53 for transmitting flow information to a remote meter reading system (not shown). A power module 56 is also provided for powering the flow measurement mechanism. The power module 56 is capable of providing regulated voltage for the entire device, and may be supplied by any well known source such as solar, battery, and DC or AC power sources.

It will be appreciated that the electronic flow module 50, local flow view module 52, communication module 54, and power module 56 maybe separately provided as illustrated in FIG. 1, or may be provided on a single main circuit board located inside the upper housing 16.

The calculated flow rate through the regulator 10 may be quickly and easily calibrated using a separate flow meter 58. The flow meter 58, which may be a turbine or other type of meter, is temporarily inserted into the downstream pipeline to measure actual fluid flow. The flow meter 58 provides feedback to an auxiliary communication device 55 (RTU, PC, etc.) or directly to the main circuit board. The feedback may be used to generate an error function based on observed flow conditions which is then incorporated into the flow calculations performed by the regulator 10, thereby to provide more accurate flow data.

Figure 3:
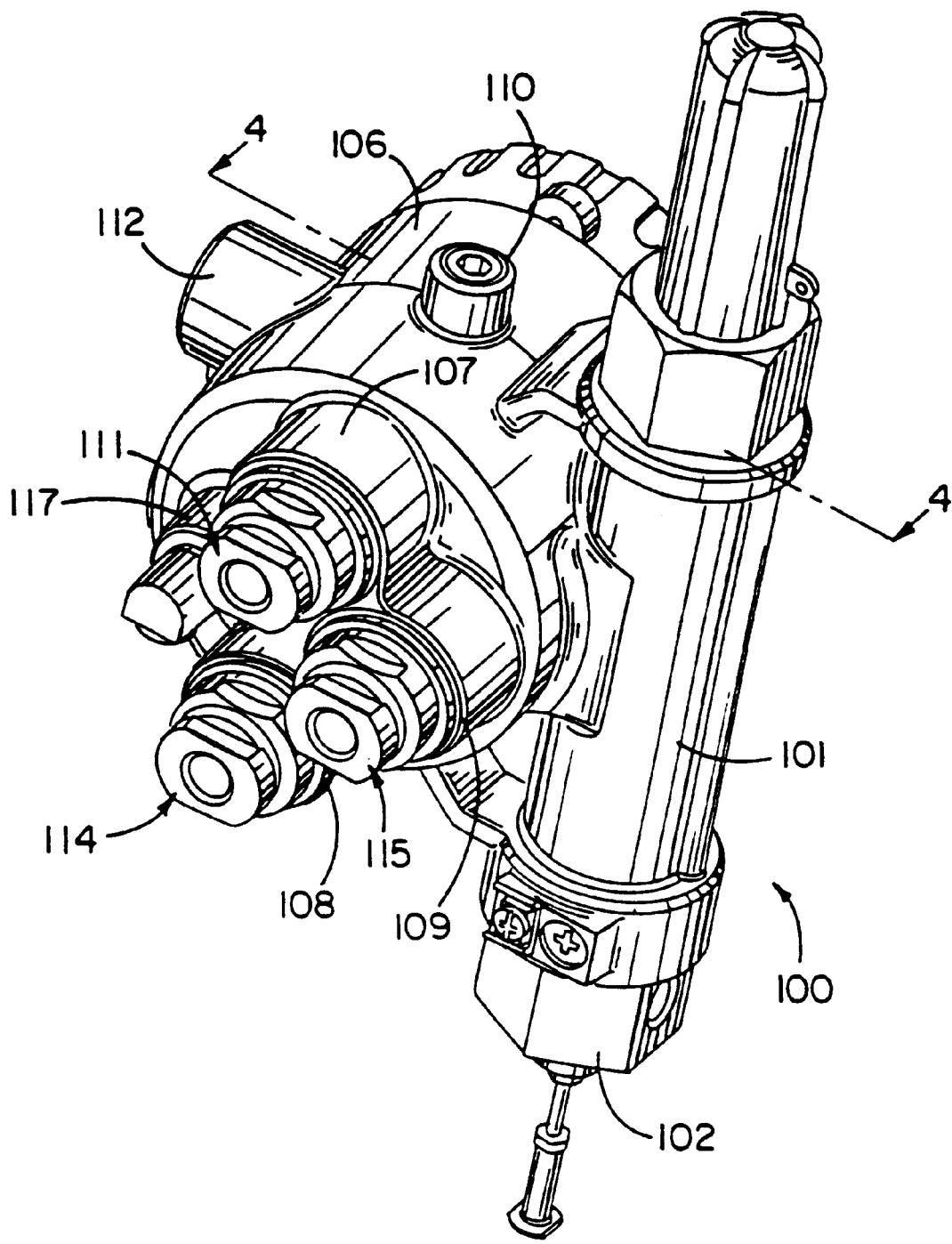
FIG. 3 is a perspective view of the regulator flow measurement apparatus.

A currently preferred embodiment of regulator flow measurement and diagnostic apparatus is illustrated in FIG. 3, generally designated by reference numeral 100. As shown in FIG. 3, the apparatus 100 includes a magnet housing 101 having a first end 102 adapted for connection to the diaphragm housing 14 of the regulator. The magnet housing 101 defines an inner surface 250, and encloses a travel indicator 103 (FIG. 4) which is adapted for connection to the diaphragm 26 (FIG. 1) in the regulator.

Figure 4:
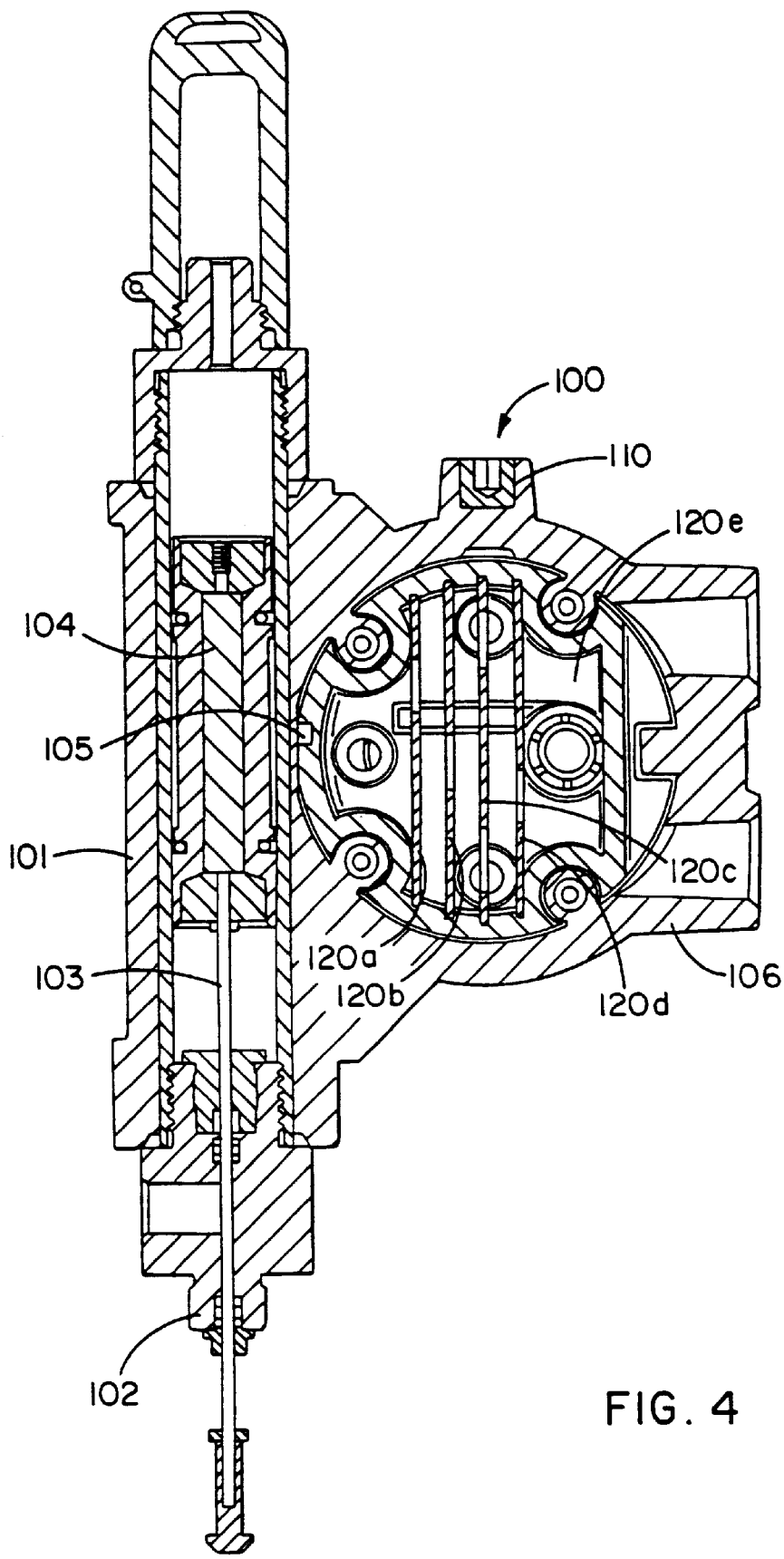
FIG. 4 is a side elevation view, in cross-section, of regulator flow measurement apparatus.
Figure 8:
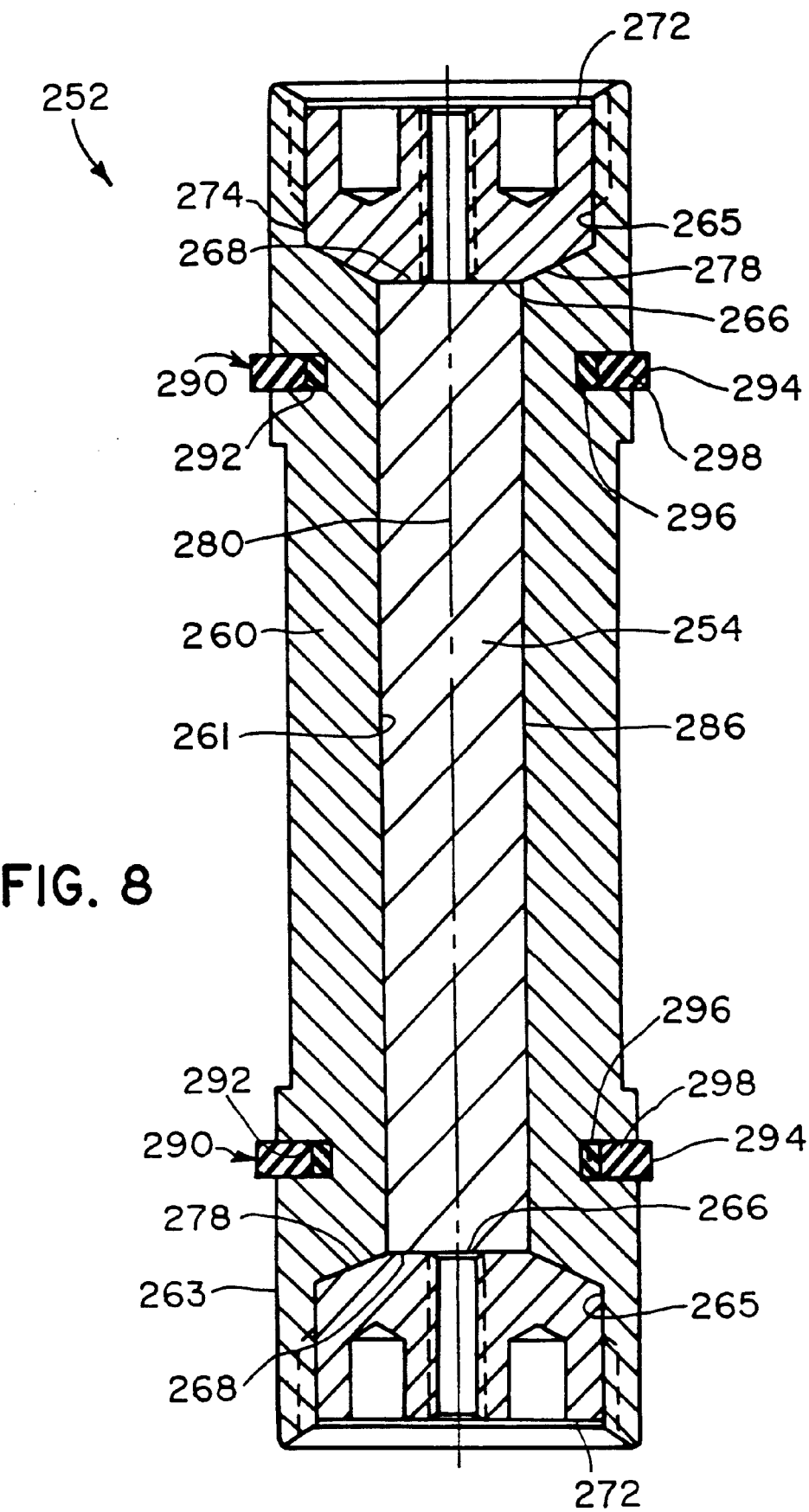
FIG. 8 is an enlarged side view, in cross section, of a magnet assembly for use in a linear travel measurement device, in accordance with the teachings of the present invention.
Figure 9:
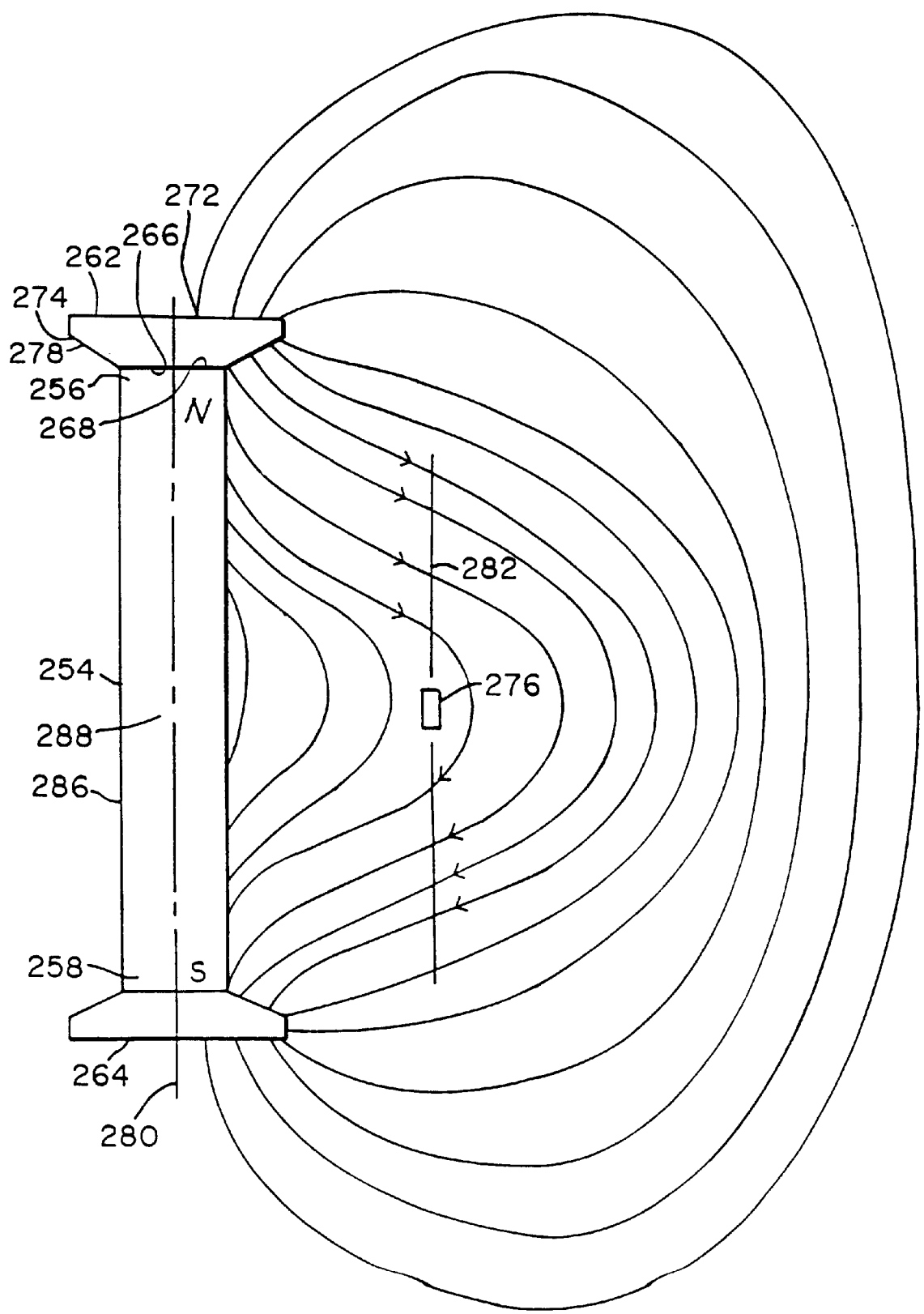
FIG. 9 is a diagram illustrating the magnet assembly shown in FIG. 8 and the associated flux pattern.

A magnet assembly 252 is disposed inside the magnet housing 101 for providing a magnetic flux pattern. As best shown in FIGS. 4, 8, and 9, the magnet assembly 252 comprises a single bar magnet 254, preferably having a cylindrical shape, having a north pole 256 and a south pole 258. The magnet 254 is preferably a permanent magnet constructed of Alnico V magnetic material that serves as a constant magnetic flux source. The magnet 254 is preferably packaged in a shuttle 260 having a central bore 261 sized to receive the magnet 254. The shuttle 260 is constructed of a non-magnetic material, preferably aluminum or ceramic, and has an outer surface 263 sized to be slidably received by the inner surface 250 of the magnet housing 101. The shuttle 260 may conveniently be a two-piece or clam-shell housing held together by a suitable fastener.

In the embodiment illustrated at FIG. 8, flux-shaping pole pieces 262, 264 are threadably fastened inside opposite end recesses 265 of the shuttle 260 to sculpt the magnetic flux generated by the magnet 254. Each of the pole pieces 262, 264 includes a face 266 arranged to confront and abut opposite end pole faces 268 of the magnet 254, as best shown in FIG. 9. The pole pieces 262, 264, which are composed of a suitable magnetic material such as G10100 cold-rolled steel, are preferably generally cylindrical in shape having opposite parallel circular surfaces 266, 272 and a cylindrical surface 274 arranged to confront a longitudinal space containing a magnetic field sensor 276. A frusto-conical surface 278 forms a transition between the circular surfaces 266 and the cylindrical surface 274, and also confronts the longitudinal space.

In a preferred embodiment of the invention, the magnet 254 has a diameter of about 0.375 inches and a length of about 2.5 inches. The diameter of the circular faces 266 on pole pieces 262, 264 is about 0.375 inches and cylindrical surface 274 has a diameter of about 0.8125 inches and a length along axis 280 of about 0.125 inches. Frusto-conical surface 278 is arranged at an angle of about 20° to surface 266. The magnetic field sensor 276 is mounted to the valve housing or other stationary object and is oriented along axis 282 parallel to axis 280. The shuttle 260 is arranged to move along axis 280. For a sensor arrangement as described, axis 282 is 0.625 inches from axis 280.

It is important to the present invention that the cylindrical surface 274 is parallel to and coaxial with axis 280 and a surface 286 of the magnet 254. This relationship is accomplished by the circular face 266 on the pole piece confronting the circular pole face 268 of the magnet and the coaxial relationship of surfaces 266 and 274. As a result of this condition, the magnetic field flux is symmetrically configured about the axis 280 of the magnet. As shown in FIG. 9, the length of the magnet 254 in a direction along axis 280 and the configuration of the cylindrical surface 274 and the frusto-conical surface 278 sculpt the fringing magnetic flux pattern in a region adjacent the magnet 254 so that the magnetic flux varies linearly along the axis 282 parallel to axis 280. Therefore, magnetic displacement sensor 276 senses a flux density that varies linearly along the length of travel of the sensor. Because the magnetic flux is uniform about the periphery of the magnet, the sensor is insensitive to relative rotation of the elements about axis 280. Hence, the sensor is insensitive to rotation of the magnet 254 about its axis 280.

The flux density increases uniformly along longitudinal line 282 parallel to the magnet from the midpoint 288 of the assembly toward the poles, to a maximum flux density directly opposite pole faces 274. Because poles 256, 258 are oppositely oriented, the flux directions through sensor 276 are in opposite directions at the regions along line 282 on each side of the midpoint 288. Hence, the flux density varies along line 282 from a maximum in one direction adjacent a pole face 274 adjacent one pole 256, through zero at midpoint 288, to a maximum in the opposite direction adjacent the pole face 274 adjacent the other pole 258. At midpoint 288 centered between the pole pieces, the magnetic flux density is at a null (zero). The sensor is calibrated by placing the sensor 276 at the midpoint 288 where magnetic field strength is zero and calibrating the sensor.

In use, the shuttle 260 reciprocates along line 280, causing the linearly-varying flux pattern of magnet 254 to pass along the sensor 276 to produce a voltage proportional to the relative position of the magnet 254 in relation to the magnet assembly 252. By sculpting the fringing flux, pole pieces 262, 264 linearize the flux over the length of the magnet. Thus, pole pieces 262, 264 dramatically increase the useful range and accuracy of the voltage readings produced by the magnetic field sensor 276.

Figure 10:
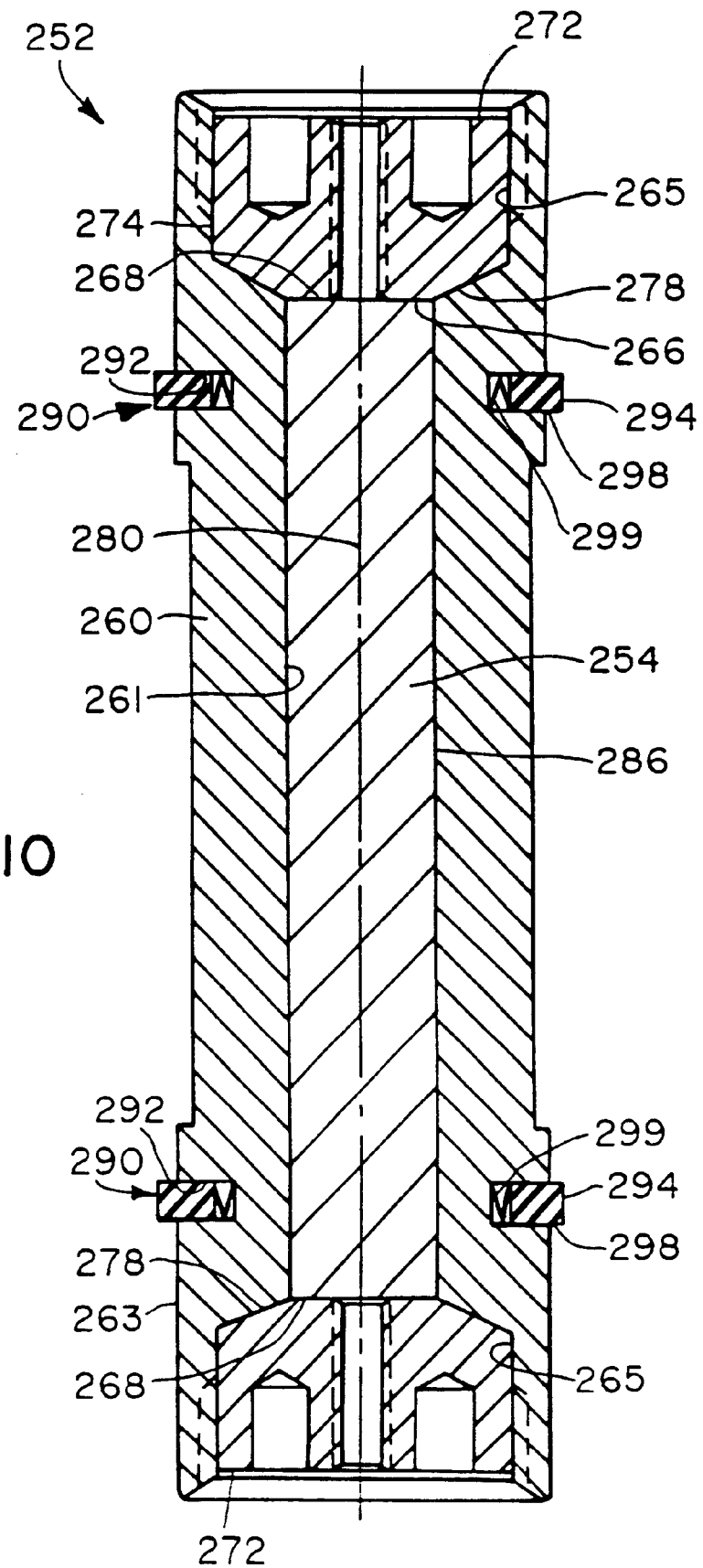
FIG. 10 is an enlarged side view, in cross section, of an alternative embodiment of the magnet assembly.

A pair of centering rings 290 is provided for further improving accuracy of the sensor voltage readings by ensuring that the magnet assembly 252 is centered in the magnet housing 101. As best shown at FIG. 8, a pair of grooves 292 are formed in the shuttle outside surface 263. The centering rings 290 are inserted into the grooves 292, each having an outwardly biased outer wall 294. The outer wall 294 engages the inner surface 250 of the magnet housing 101 thereby to center the magnet assembly 252 inside the magnet housing 101. In the embodiment illustrated at FIG. 8, each centering ring 290 comprises an inner O-ring 296 formed of a relatively resilient material, such as rubber, and an outer ring 298 formed of a relatively rigid material having a relatively low coefficient of friction, such as plastic, to allow the outer rings 298 to slide along the magnet housing inner surface 250. It will be appreciated, however, that other materials may be used to bias the outer wall 294 outwardly. For example, in the embodiment illustrated at FIG. 10, each centering ring 290 has an inner member comprising an annular spring 299, and an outer member comprising a plastic outer ring 298. The annular spring 299 may be formed of metal, such as steel.

Figure 11:
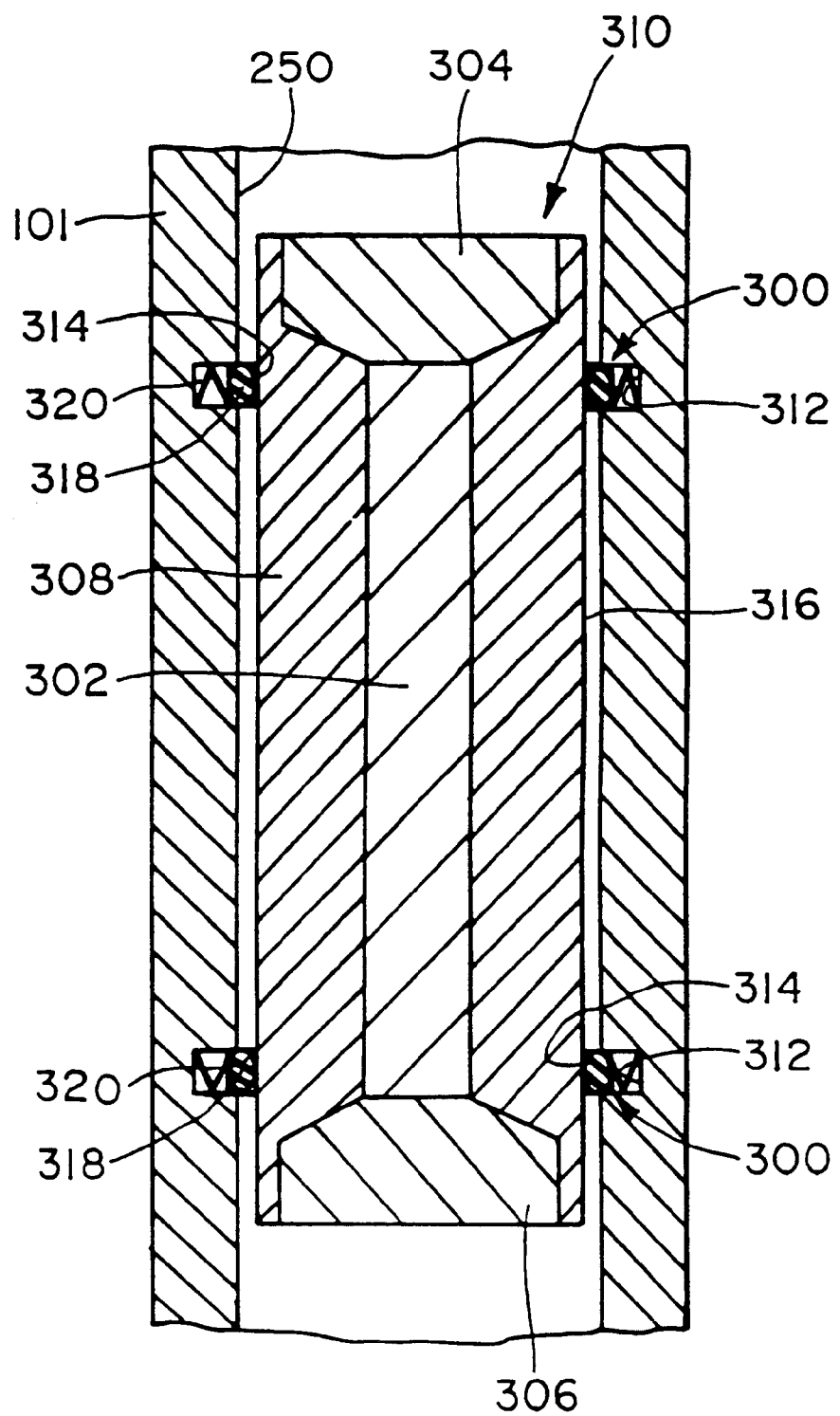
FIG. 11 is an enlarged side view, in cross section, of yet another alternative embodiment of the magnet assembly.

In an alternative embodiment illustrated at FIG. 11, a pair of centering rings 300 are provided which generate an inward force for centering a magnet 302 in the magnet housing 101. Pole pieces 304, 306 are positioned at opposite ends of the magnet 302 to sculpt the magnet flux. A shuttle 308 is provided for packaging the magnet 302 and pole pieces 304, 306 in an integral magnet assembly 310. Grooves 312 are formed in the inner surface 250 of the magnet housing 101 and are sized to receive outer portions of the centering rings 300. Each centering ring 300 includes an inner wall 314 that is biased inwardly to engage an outer surface 316 of the shuttle 308. In the embodiment of FIG. 11, each centering ring 300 includes an inner rigid member, such as inner plastic ring 318, defining the inner wall 314. Each centering ring 300 further includes an outer resilient member, such as outer annular spring 320, which pushes inwardly on the inner plastic ring 318 to bias the inner wall 314. As a result, the magnet 302 is centered inside the magnet housing 101.

While each of the illustrated embodiments shows the use of two centering rings, it will be appreciated that a single centering ring may be used, depending on the relative lengths of the biased wall and the magnet. Furthermore, more than two centering rings may be provided without departing from the spirit and scope of the present invention.

An electrical housing 106 is attached to the magnet housing 101 and has a first pressure port 107, a second pressure port 108, an auxiliary pressure port 109, and an auxiliary port 110 (FIG. 3). A first pressure sensor assembly 111 is inserted inside the first pressure port 107, and a tube (not shown) connects the assembly 111 to the upstream section of the flow passage. A second pressure sensor assembly 114 is inserted into the second pressure port 108, and a tube (not shown) connects the second assembly 114 to the downstream section of the flow passage. A third pressure sensor assembly 115 nay be inserted into the auxiliary pressure port 109 for measuring at a third pressure point. The third pressure sensor 115 may be used to measure pressure at a variety of locations, including in the flow passage or in the regulator to infer plug travel, as described in greater detail above with regard to the previous embodiment. In a preferred embodiment, a fourth pressure port 117 is provided for measuring atmospheric pressure. The auxiliary port 110 is provided for receiving discrete or analog input from another device, such as the temperature transmitter 48 illustrated in FIG. 1. In addition, an I/O port 112 is provided for connection to an outside device, as described in greater detail below.

Figure 5:
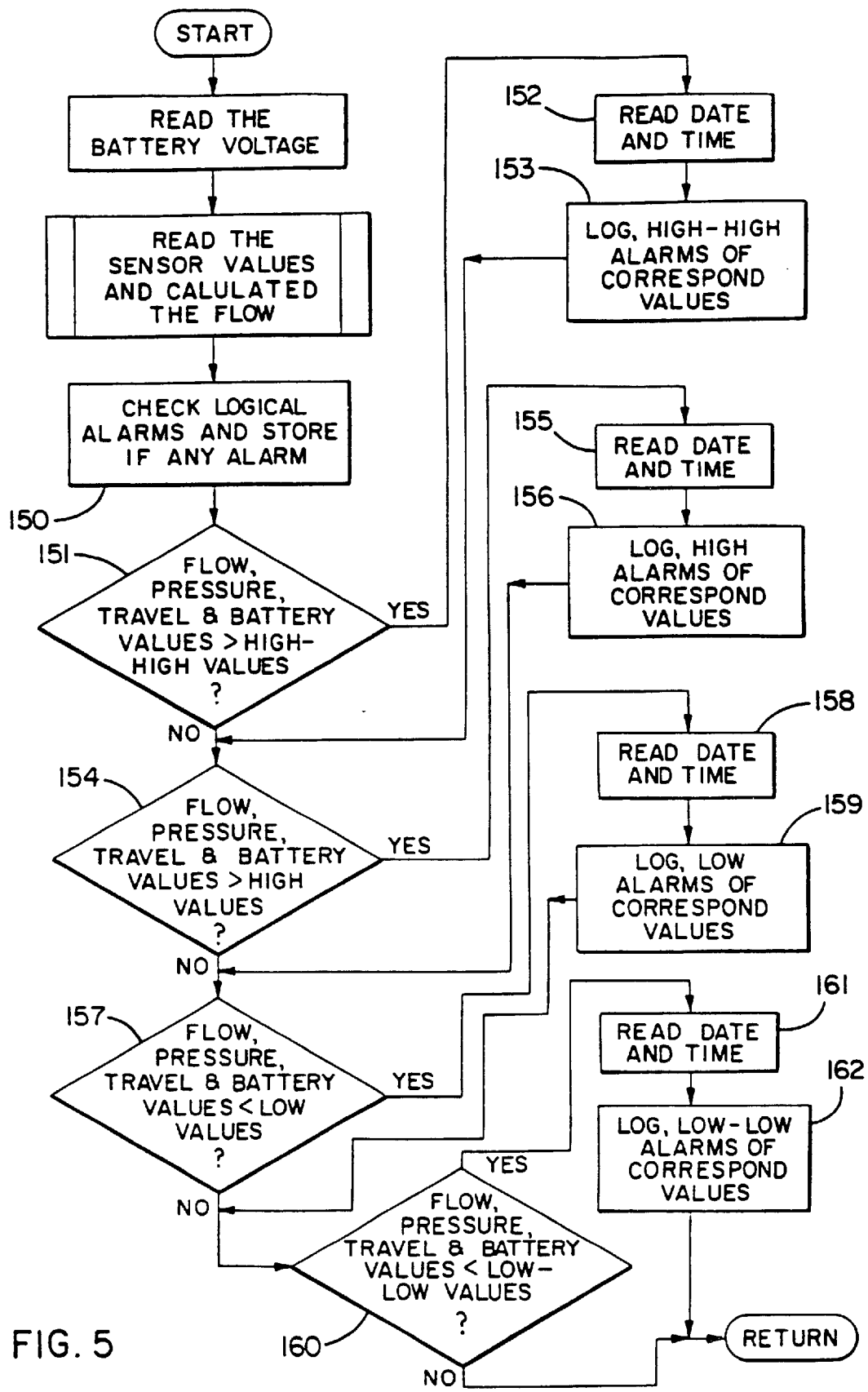
FIG. 5 is a flow chart schematically illustrating a user-specified limit portion of an alarm routine.

A plurality of circuit boards 120a–e are disposed inside the housing for controlling various operations of the apparatus 100 (FIG. 5). In the illustrated embodiment, a first (or main) circuit board 120a may include an interface for the first, second, third pressure sensors, and atmospheric pressure sensors, and a connection for the magnetic field sensor 276. A second (or communication) circuit board 120b provides an interface for communication with outside devices. The second circuit board 120b may include connection for wired transmission, such as a modem card, an RF232 communication driver, and a CDPD modem. In addition or alternatively, a transceiver may be provided for wireless communication. A third (or main) circuit board 120c preferably includes a processor, a memory, a real-time clock, and communication drivers for two communication channels. The processor may include, among other things, one or more of the algorithms noted above for calculating flow rate, while the memory may store selected parameters, such as the high and low pressures for each day. An optional fourth circuit board 120d provides an interface for the auxiliary communication device 55. A fifth (or termination) board 120e is also provided having a power supply regulator, field termination (for connection to I/O devices), a back-up power supply, and connections into which the other boards 120a–d may plug into. While five circuit boards 120a–e are shown in the illustrated embodiment, it will be appreciated that a single circuit board, less than five circuit boards, or more than five circuit boards may be used without departing from the scope of the invention.

It will be appreciated, therefore, that communication between the apparatus 100 and an outside device may be by RF modem, ethernet or other known communication like. The processor allows the outside devices to enter information such as desired pressure set points and alarm conditions into the apparatus 100, and retrieve data stored in the memory. The data retrieved may include the alarm log and stored operational parameters. For instance, the retrieved information may include a history of upstream and downstream pressures stored periodically in memory, so that the apparatus 100 provides the function of a pressure recorder.

In accordance with certain aspects of the present invention, the processor includes a routine for generating alarm signals. A first portion of the routine compares measured parameters (i.e., the upstream pressure, downstream pressure, and travel position) to certain user-specified limits, as schematically illustrated in FIG. 5. In addition, one or more logic sub-routines may be run which compares at least two of the measured parameters and generates an alarm signal based on a specific logical operation, examples of which are schematically shown in FIGS. 6 and 7A–7D.

Turning first to the level alarms, a check is initiated 150 to determine whether any level limits have been entered by the user. The pressure, travel, flow, and battery values are first compared to user entered high—high limits 151. If any of the values exceeds the high—high limits, the date and time are read 152 and a corresponding high—high alarm is logged 153. Next the measured values are compared to user entered high limits 154. If any of the values exceeds the high limits, the date and time are read 155 and a corresponding high alarm is logged 156. The values are then compared to user entered low limits 157. If any of the values is lower than a user entered low limit, the date and time are read 158 and a corresponding low alarm is logged 159. Finally, the values are compared to user entered low—low limits 160. If any of the values is lower than a low—low limit, the date and time are read 161 and a corresponding low—low alarm is logged 162.

Additional limit alarms may be set based on the calculated flow rate F. For example, a user may enter limits for instantaneous and accumulated flow. When the calculated flow rate F exceeds either of these limits, an alarm is triggered. A further alarm may be provided based on stem travel. The user may enter a limit for accumulated stem travel distance and trigger a maintenance alarm when accumulated stem travel exceeds the limit.

Figure 6:
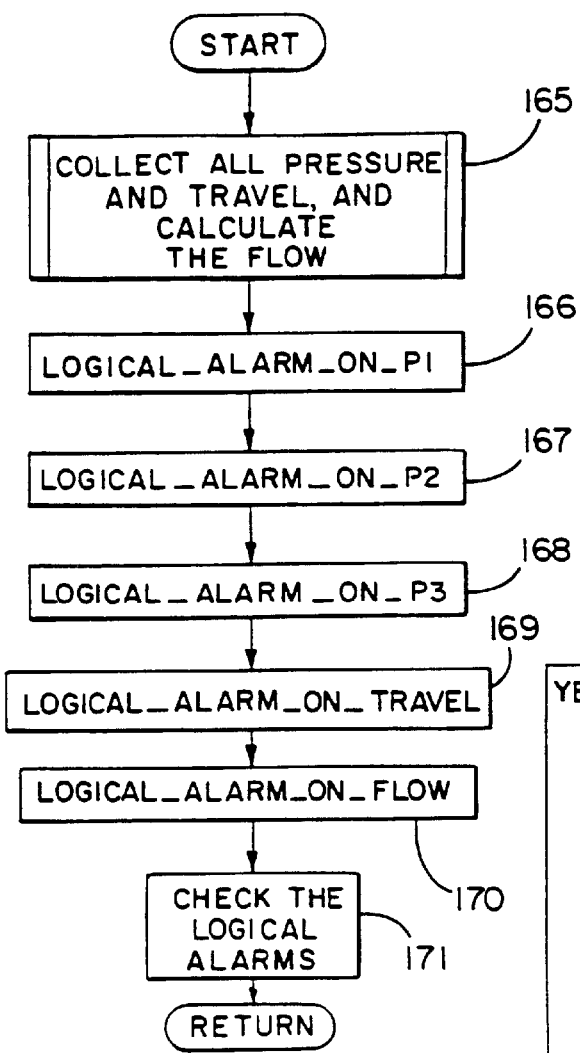
FIG. 6 is a flow chart schematically illustrating a logic alarm sub-routine.

After checking the user-entered limit alarms, one or more logic sub-routines may be run to determine if any logical alarm conditions exist. In the preferred embodiment, each of the logic sub-routines is combined into a single, integrated logic sub-routine as generally illustrated in FIG. 6. As shown in FIG. 6, the sub-routine begins by collecting all the pressure and travel data, in calculating the flow 165 through the pressure regulator. Each of the measured parameters is then compared to both the other measured parameters and any user-specified set points. The logical alarms are monitored for upstream pressure 166, downstream pressure 167, auxiliary pressures 168, stem travel 169, and flow rate 170. Additional logical alarms may also be provided for feedback from the third pressure sensor assembly and auxiliary device connected to the I/O connection 112. After obtaining the relative values of each of the parameters, the logical alarms are then checked, as described in greater detail below.

Figure 7A:
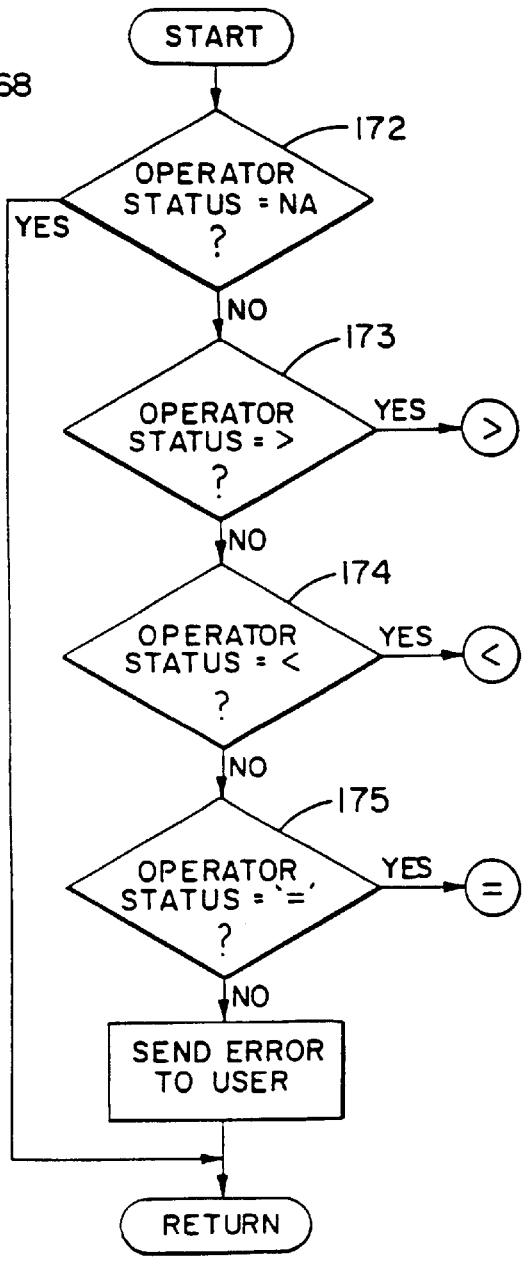
FIGS. 7A–7E are flow charts schematically illustrating specific portions of the logic alarm sub-routine.

A preferred sequence of operations for determining logical alarms based on upstream pressure (step 166) are schematically shown in FIG. 7A. First, the sub-routine checks for an entered value relating to upstream pressure 172. If a value is entered relating to upstream pressure, the sub-routine determines whether the measured upstream pressure must be greater than 173, less than 174, or equal to 175 the user-entered value. For each relative comparison (i.e., steps 173, 174 and 175), a series of sub-steps are performed as illustrated in FIGS. 7B–7D.

Figure 7B:
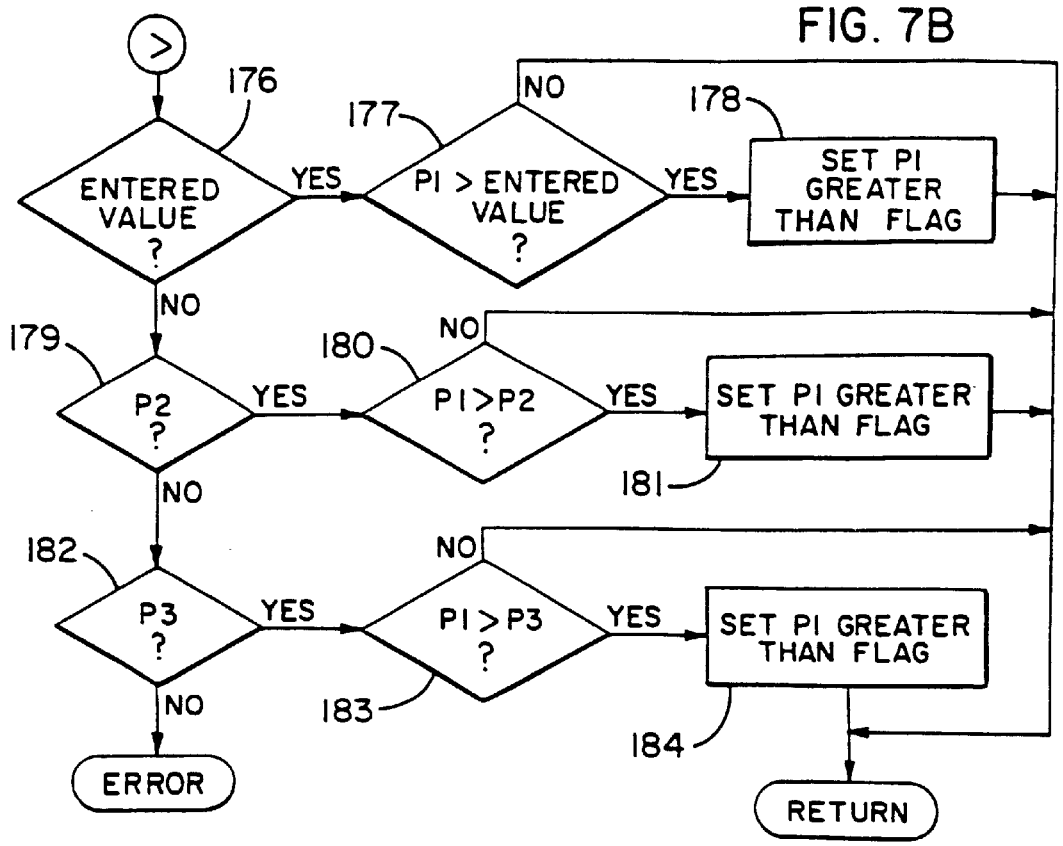

If an alarm requires the upstream pressure to be greater than a certain value, the sub-routine first checks for a specific upstream pressure value entered by the user 176 (FIG. 7B). If the user has entered a value for upstream pressure, the measured upstream pressure is compared to that entered value 177. If the measured value is greater than the entered value, the upstream pressure greater than flag is set 178. If no specific user-entered value is used, the sub-routine checks to see if downstream pressure is to be compared to the upstream pressure 179. If so, the sub-routine determines if the upstream pressure is greater than the downstream pressure 180. If so, the upstream pressure greater than downstream pressure flag is set 181. If downstream pressure is not used as a logical alarm, the sub-routine next checks for a logical alarm value based on auxiliary pressure 182. If auxiliary pressure is used as a logical alarm, the sub-routine checks whether upstream pressure is greater than the downstream pressure 183. If so, the upstream pressure greater than auxiliary pressure flag is set 184.

Figure 7C:
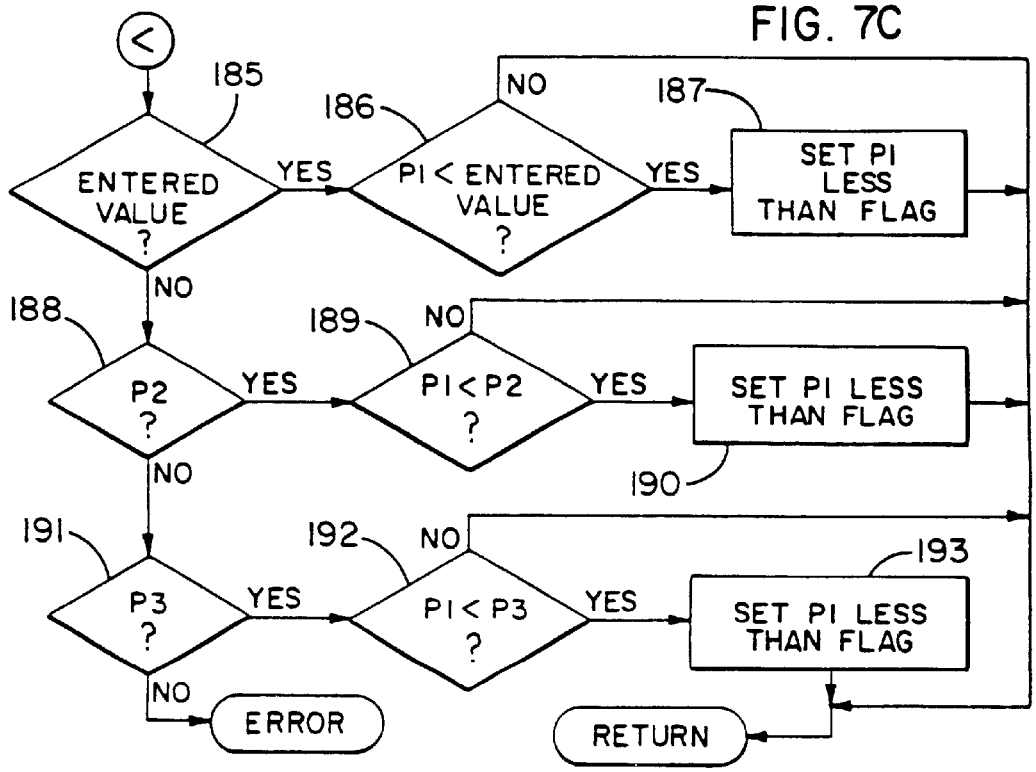
Figure 7D:
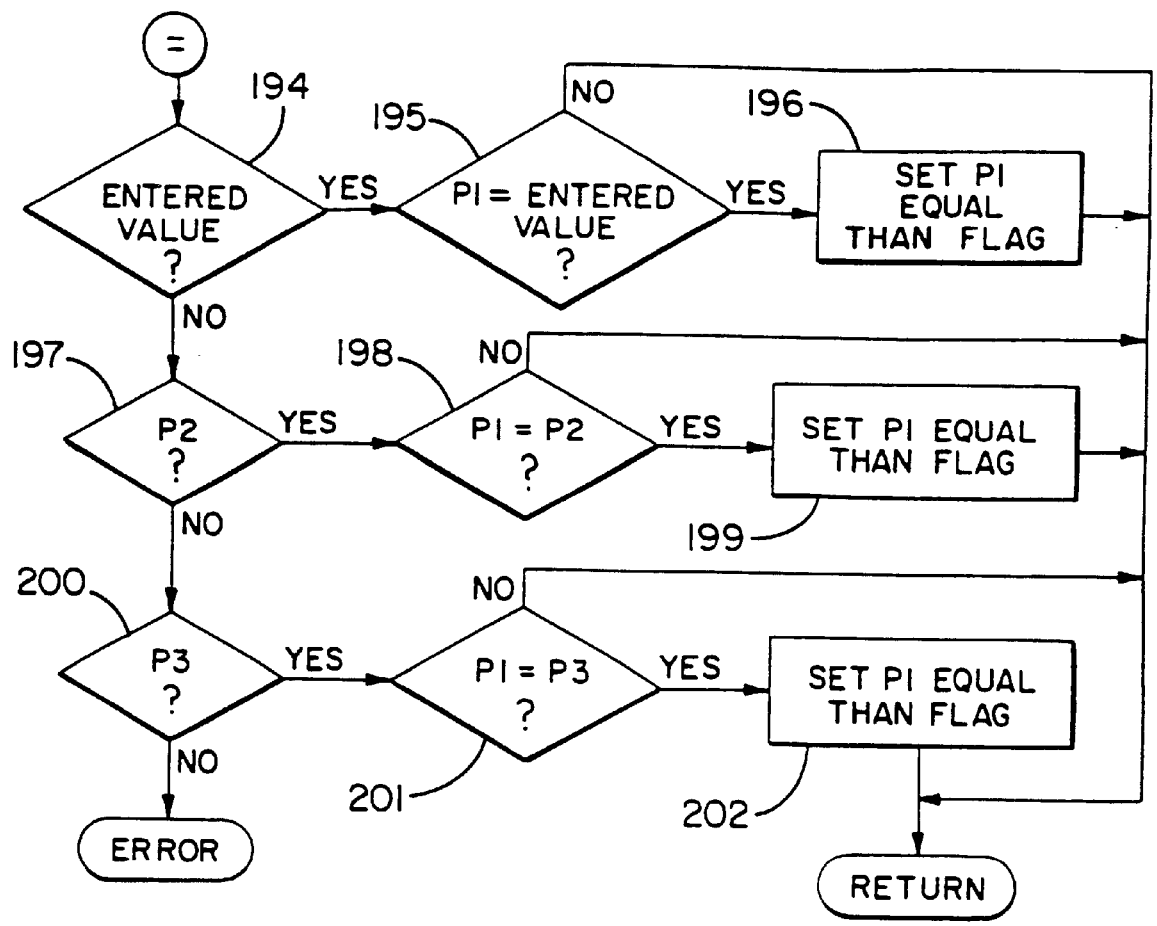

As illustrated in FIGS. 7C and 7D, the sub-routine performs similar steps to determine if upstream pressure is less than or equal to a logical alarm value 185–202. Furthermore, operations identical to those shown in FIGS. 7B–7D are performed for the downstream and auxiliary pressures to determine whether they are greater than, less than, or equal to specified logic alarm values. Since these operations are identical, separate flow charts illustrating these steps are not provided.

Figure 7E:
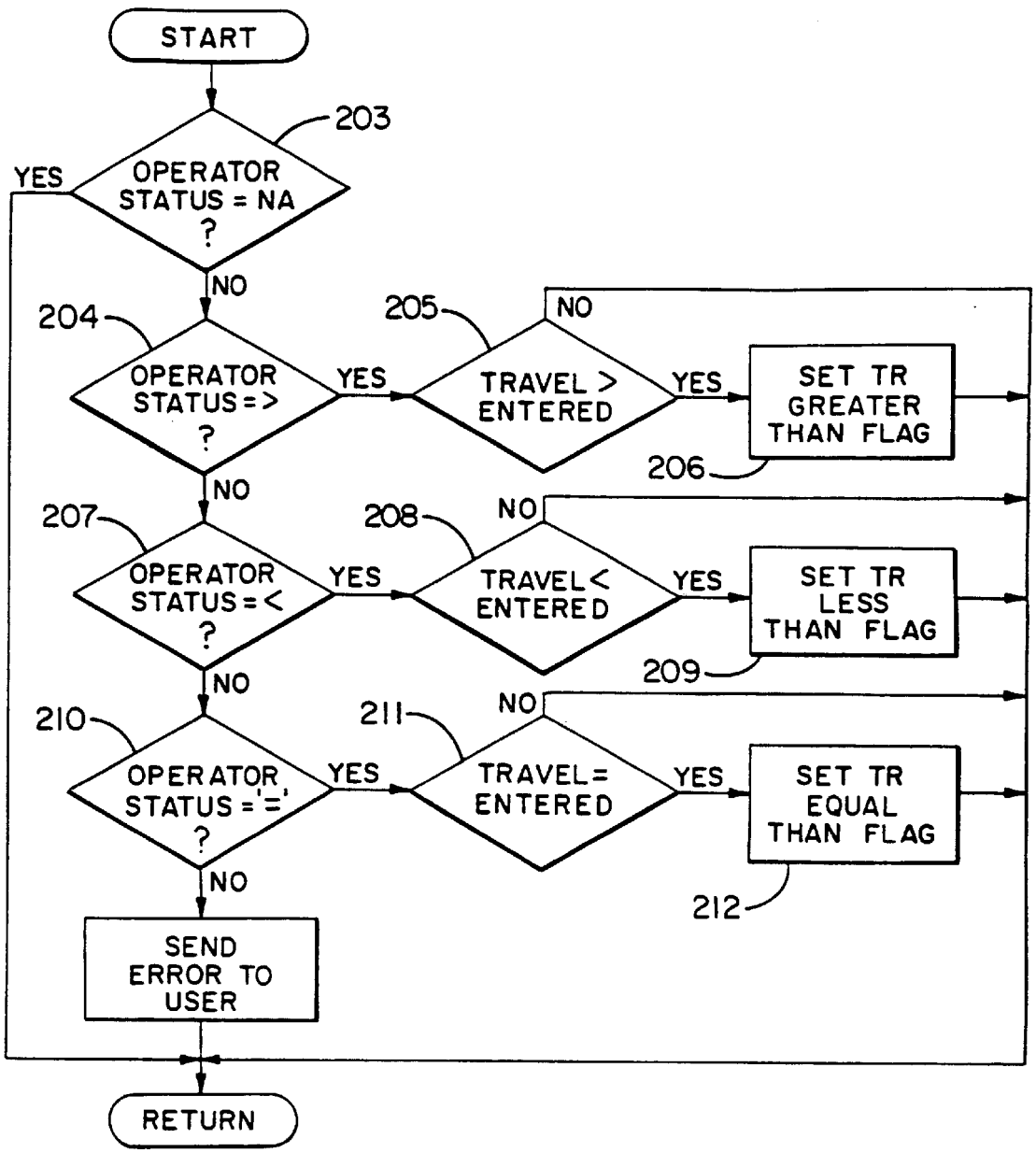

Turning to logic alarms based on travel 169 (FIG. 7A), a logic sequence flow chart is illustrated at FIG. 7E. Accordingly, the sub-routine first checks whether a travel position logic value has not been entered 203. If a traveled position logic value has been entered, the sub-routine determines whether the measured value must be greater than the logic value 204. If the logic operator is a greater than limit, the sub-routine determines whether the measured traveled position is greater than the entered value 205. If so, the travel greater than flag is set 206. If no "greater than" limit is used for travel, the sub-routine then checks for a "less than" limit 207. If a "less than" limit is detected, the sub-routine determines if the measured travel is less than the entered value 208. If so, the travel less than flag is set 209. If a "less than" value is not used, the sub-routine checks for an "equal to" operator limit 210. If an "equal to" limit is used, the sub-routine determines whether the measured travel equals the entered value 211. If so, the travel equal to flag is set 212. A similar sequence of steps may be used to determine if the calculated flow rate is greater than, less than, or equal to a logic flow alarm value, as called for at step 170 of FIG. 6.

Based on the logic flags which may be set, certain logic alarms may be triggered based on a comparison of two of the measured parameters. For example, a shut off problem alarm may be set to trigger when travel position equals zero and downstream pressure is increasing (present downstream pressure is greater than immediately preceding measured downstream pressure). When the appropriate operational conditions exist to set the corresponding logic flags, the shut off problem alarm is triggered, which may indicate that fluid is leaking through the pressure regulator possibly due to damage to the throttling element. Another logic alarm may be generated when the travel value is greater than zero and the downstream pressure signal is decreasing, which may indicate a broken stem. Yet another logic alarm maybe generated when the travel value is greater than zero and the upstream pressure signal is increasing, which may also indicate a broken stem or other problem with the regulator. A further logic alarm may be triggered when the travel signal is greater than zero and the downstream pressure signal is greater than a user entered downstream pressure limit, which may indicate a problem with the pilot which controls the regulator. Other logic alarms may be entered which take into account the various measured and calculated values, so that other potential problems with the regulator may be immediately indicated.

The memory associated with the processor preferably includes an alarm log which tracks the date, time, and type of alarm. The alarm log is accessible by an outside communication device to allow an alarm history to be retrieved. Furthermore, the processor preferably includes a report by exception (RBX) circuit which automatically communicates any alarm conditions to a remotely located host computer. Accordingly, potential problems in the pipeline are quickly reported, and the particular component or damaged area is identified.

While a combined regulator flow measurement and diagnostic apparatus has been illustrated and described, it will be appreciated that a separate regulator flow measurement apparatus or a separate regulator diagnostic apparatus may be provided in accordance with the present invention.

The foregoing detailed description has been given for clearness of understanding only, and no unnecessary limitations should be understood therefrom, as modifications will be obvious to those skilled in the art.

What is claimed is:

1. A pressure regulator comprising:
   a main housing having an inlet and an outlet, a fluid flow path being defined between the inlet and the outlet;
   a throttling element moveable in the fluid flow path; and
   a throttling element position sensor including:
      a magnet housing supported in fixed relation to the main housing and defining an inner surface;
      a magnet sized for insertion into the magnet housing and adapted for movement with the throttling element, the magnet having a north pole and a south pole, wherein the magnet generates a magnetic flux;
      a centering ring positioned between the magnet and the magnet housing, the centering ring including a biased wall acting to center the magnet in the magnet housing; and
      a magnetic field sensor positioned to detect the magnet flux.

2. The regulator of claim 1, in which the centering ring comprises a resilient member and a rigid member, the rigid member defining the biased wall.

3. The regulator of claim 2, in which the resilient member comprises a rubber O-ring.

4. The regulator of claim 2, in which the resilient member comprises an annular spring.

5. The regulator of claim 2, in which the rigid member comprises a plastic ring.

6. The regulator of claim 2, in which the centering ring is supported for movement with the magnet, and in which the resilient member comprises an inner ring and the rigid member comprises an outer ring, the outer ring having an outer wall defining the biased wall, the outer wall being biased outwardly to engage the inner surface of the magnet housing.

7. The regulator of claim 6, further comprising a shuttle having a central bore sized to receive the magnet and an outer surface sized for insertion into the magnet housing, the outer surface defining a groove sized to receive an inner portion of the centering ring.

8. The regulator of claim 7, further comprising a flux-shaping pole piece on each of the north and south poles of the magnet, wherein the shuttle includes two end recesses sized to receive the flux-shaping pole pieces.

9. The regulator of claim 2, in which the centering ring is fixed relative to the magnet housing, wherein the resilient member comprises an outer ring and the rigid member comprises an inner ring, the inner ring having an inner wall defining the biased wall, wherein the outer ring inwardly biases the inner wall.

10. The regulator of claim 9, further comprising a shuttle having a central bore sized to receive the magnet and an outer surface sized for insertion into the magnet housing, the magnet housing inner surface defining a groove sized to receive an outer portion of the centering ring, wherein the inner wall engages the shuttle outer surface.

11. The regulator of claim 10, further comprising a flux-shaping pole piece on each of the north and south poles of the magnet, wherein the shuttle includes two end recesses sized to receive the flux-shaping pole pieces.

12. The regulator of claim 1, further comprising a flux-shaping pole piece on each of the north and south poles of the magnet.

13. The regulator of claim 1, further comprising a second centering ring positioned between the magnet and the magnet housing, the second centering ring including a biased wall acting to center the magnet in the magnet housing.

14. The regulator of claim 1, further comprising a travel indicator connected at one end to the throttling element and at an opposite end to the magnet.

* * * * *